(12) United States Patent
Pichan

(10) Patent No.: US 6,553,697 B1
(45) Date of Patent: Apr. 29, 2003

(54) TRAILER HITCH DISPLAY APPARATUS

(76) Inventor: David L. Pichan, 13360 Bunton, Willis, MI (US) 48150

( * ) Notice: Subject to any disclaimer, the term of this patent is extended or adjusted under 35 U.S.C. 154(b) by 0 days.

(21) Appl. No.: 09/680,373

(22) Filed: Oct. 5, 2000

(51) Int. Cl.⁷ .................. G09F 21/04; G09F 13/04
(52) U.S. Cl. ................... 40/591; 40/205; 40/575
(58) Field of Search .................... 40/205, 564, 574, 40/575, 590, 591, 716; 224/519; 280/504, 727; D12/162

(56) References Cited

U.S. PATENT DOCUMENTS

| | | | |
|---|---|---|---|
| 2,622,356 A | | 12/1952 | Valente |
| 4,021,949 A | * | 5/1977 | Niehaus et al. ........... 40/576 X |
| 4,114,299 A | * | 9/1978 | Brownlee .................... 40/545 |
| 4,800,471 A | * | 1/1989 | Lippert ........................ 362/80 |
| 4,977,695 A | | 12/1990 | Armbruster |
| 5,018,291 A | * | 5/1991 | Pasquale et al. .......... 40/611 X |
| 5,092,503 A | * | 3/1992 | Cocks ..................... 224/42.44 |
| 5,603,178 A | | 2/1997 | Morrison ...................... 40/591 |
| 5,979,094 A | | 11/1999 | Brafford, Jr. .................. 40/590 |
| 6,007,033 A | * | 12/1999 | Casson et al. ........... 248/224.7 |
| 6,053,627 A | * | 4/2000 | Vo et al. ...................... 362/485 |
| 6,079,136 A | * | 6/2000 | Kozlarek .................. 40/556 X |
| 6,247,257 B1 | * | 6/2001 | Powell ........................ 40/591 |
| 6,412,202 B1 | * | 7/2002 | Oswood ...................... 40/591 |

FOREIGN PATENT DOCUMENTS

EP   0 791 911 A2   2/1997

* cited by examiner

Primary Examiner—Brian K. Green
(74) Attorney, Agent, or Firm—Young & Basile, P.C.

(57) ABSTRACT

A trailer hitch display apparatus having readily attachable/detachable display panels. Generally comprising a housing, a display panel and a connecting assembly. The housing generally carries a left turn signal, a right turn signal, a left tail light, a right tail light, a brake light, a protective cover and the display panel, wherein the turn signals, the tail lights and the brake light are electrically connected to the wiring of the vehicle to allow another rearwardly traveling vehicle to observe through the trailer hitch display apparatus any traffic signals or tail lights. The connecting assembly comprises a trailer-hitch attaching member dimensioned to be received within the receiving trailer-hitch member of the vehicle. A plurality of throughholes is provided in the trailer-hitch attaching member for inserting a retention pin to secure the two members together.

13 Claims, 5 Drawing Sheets

TRAILER HITCH DISPLAY APPARATUS

TECHNICAL FIELD

The present invention relates generally to hitching devices and, more specifically, to an illuminated trailer hitch display apparatus.

BACKGROUND ART

The increased popularity of trucks, sports utility vehicles and other recreational vehicles has resulted in a dramatic increase in the use of trailers. Vehicle-pulled trailers are utilized to haul a wide variety of items including boats, lawn maintenance equipment, campers, motorcycles, cargo trailers, etc. Many vehicles are factory-equipped with a trailer hitch and an associated wiring connector to control the lights on the trailer, while other trailer hitches are installed by after-market suppliers.

When the trailer hitch is not being used with a trailer, the hitch is exposed to the weather thereby often resulting in premature rust and damage. Consequently, ornamental covers for trailer hitches have been devised to not only protect the trailer hitch from weather and physical damage, but also to improve its appearance. Other ornamental covers combine protection and the ability to advertise a message from the owner of the vehicle. These designs either do not provide any illumination for the selected message or require extensive additional lights and brake panels in order to advertise the selected message.

Examples of such designs may be found by reference to U.S. Pat. No. 5,603,178 to Morrison. Although the trailer hitch provides protection from weather exposure and expresses a desired message, the message cannot be seen at night or whenever adequate lighting is not provided. At the other extreme, U.S. Pat. No. 5,979,094 to Bradford discloses a lighted sign for a trailer hitch but requires additional brake panels and brake lights to accompany the message on the sign. Moreover, the Bradford patent does not provide a suitable means for removably securing the display panel to the frame.

It is readily apparent that a new and improved illuminated trailer hitch display apparatus is needed that does not require additional brake panels and brake lights to adequately view the display panel, and that provides a simple and easy means for removably attaching display panels. It is, therefore, to the provision of such an improvement that the present invention is directed.

BRIEF SUMMARY OF THE INVENTION

Briefly described, in a preferred embodiment, the present invention overcomes the above-mentioned disadvantages by providing a trailer hitch display apparatus having readily attachable/detachable display panels. Generally, the present invention, in the preferred embodiment, comprises a housing, a display panel and a connecting assembly. More specifically, the housing generally carries a left turn signal, a right turn signal, a left tail light, a right tail light, a brake light, a protective cover and the display panel, wherein the turn signals, the tail lights and the brake light are electrically connected to the wiring of the vehicle to allow another rearwardly traveling vehicle to observe through the trailer hitch display apparatus any traffic signals or tail lights.

The connecting assembly comprises a trailer-hitch attaching member dimensioned to be received within the receiving trailer-hitch member of the vehicle. A plurality of through-holes is provided in the trailer-hitch attaching member for inserting a retention pin to secure the two members together.

The display panel comprises preferably two lower tabs and one upper tab that are shaped and dimensioned to be received within slits formed on an upper wing and a lower wing, wherein the wings are attached to the housing. As such, the display panel can be easily removed and/or replaced.

A feature and advantage of the present invention is to provide a new and improved trailer hitch display apparatus that can be easily installed on or removed from a vehicle trailer hitch.

Another feature and advantage of the present invention is provide a new and improved trailer hitch display apparatus having turn signals, tail lights and brake lights for warning or alerting rearwardly traveling vehicles.

Another feature and advantage of the present invention is to provide a new and improved trailer hitch display apparatus having a display panel with a desired indicia thereon that can be easily installed on or removed from the apparatus.

Another feature and advantage of the present invention is provide a new and improved trailer hitch display apparatus having a protective panel that may be translucent red and/or yellow to provide appropriate vehicle signaling.

These and other objects, features and advantages of the invention will become more apparent to one skilled in the art from the following description and claims when read in light of the accompanying drawings.

DETAILED DESCRIPTION OF THE PREFERRED AND ALTERNATE EMBODIMENTS

In describing the preferred embodiment of the present invention as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

Figure 1:
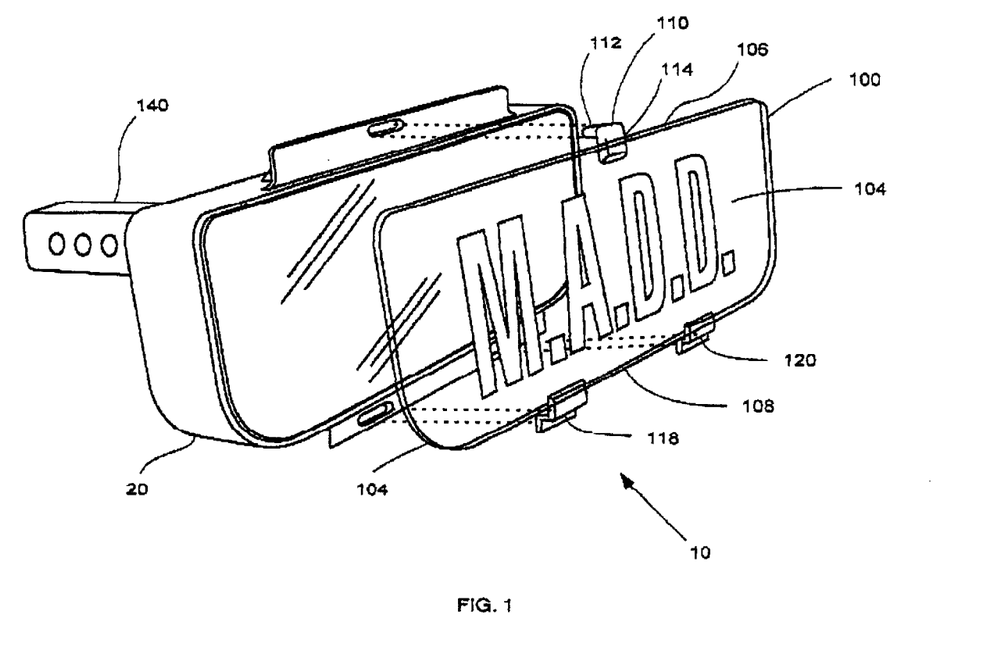
FIG. 1 is a partially exploded front perspective view of the present invention according to a preferred embodiment.
Figure 2:
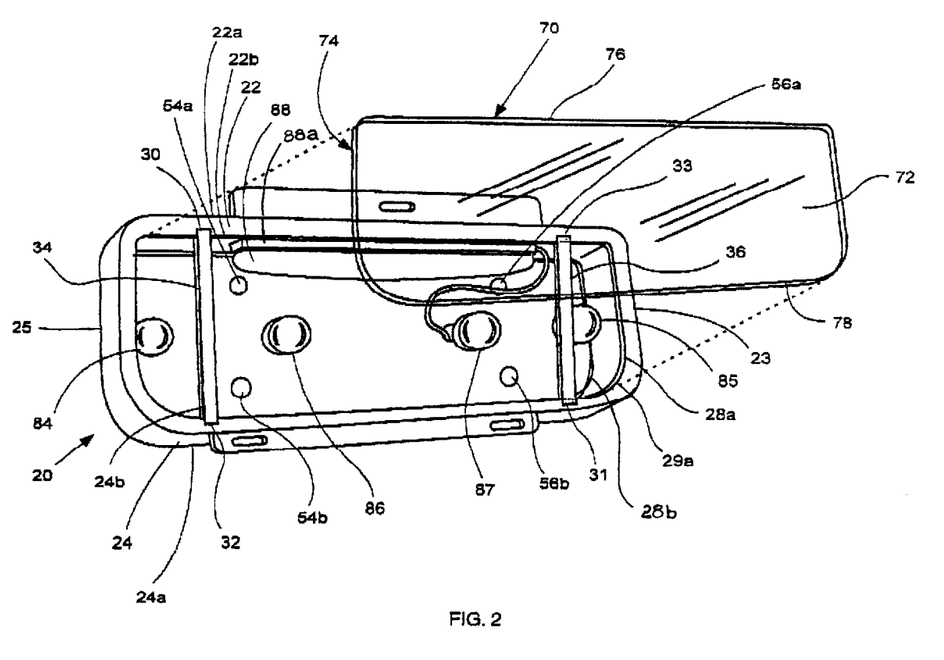
FIG. 2 is a partially exploded front perspective view of the present invention according to a preferred embodiment.

Referring now to FIGS. 1 and 2, trailer hitch display apparatus 10 generally comprises housing 20, display panel 100 and connecting assembly 140. More specifically, housing 20 is preferably a rectangular-shaped enclosure defined by first wall 22, second wall 23, third wall 24, fourth wall 25 and rear wall 26. The front edge of walls 22, 23, 24, 25 define a generally rectangular-shaped front recessed area 28a having front lip 29a, wherein front recessed area 28a and front lip 29a are dimensioned for receiving protective translucent panel 70, as more fully described below. The rear edge of walls 22, 23, 24, 25 define a generally rectangular-shaped rear recessed area 28b having rear lip 29b, wherein rear recessed area 28b and rear lip 29b are dimensioned for receiving rear vertical surface 26, as more fully described below.

First slot 30 and second slot 31 are formed in vertical alignment in first wall 22 and third wall 24, respectively, proximal to fourth wall 25 and are dimensioned for receiving first vertical support member 34. Third slot 32 and fourth slot 33 are formed in vertical alignment in first wall 22 and third wall 24, respectively, proximal to second wall 23 and are dimensioned for receiving second vertical support member 36. Protective translucent panel 70 is received within front recessed area 28a, wherein back surface 74 rests upon first vertical support member 34 and second vertical support member 36. Front surface 72 of protective translucent panel 70 is preferably flush with front lip 29a. Protective translucent panel 70 is preferably formed of a red translucent plastic to indicate to rearwardly traveling vehicles that the vehicle is stopping when the brakes are applied. However, depending on the application, any one or a combination of colored translucent material may be utilized.

Figure 3:
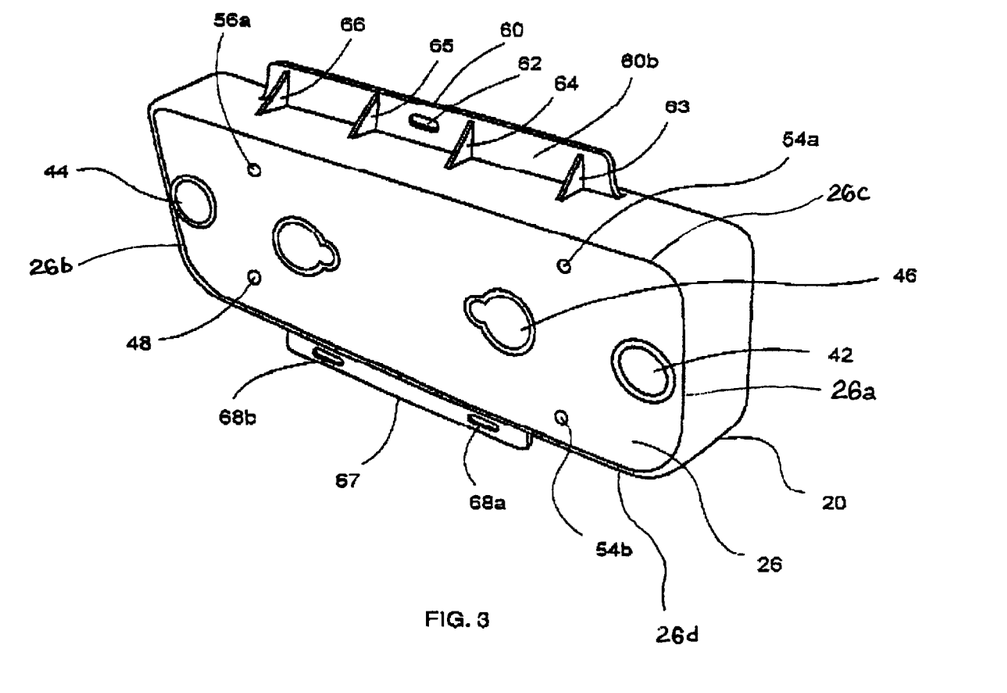
FIG. 3 is a rear perspective view of the housing of the present invention according to a preferred embodiment, separated from the trailer hitch shell.

As shown in FIGS. 2–3, upper bracket 60 is attached generally to or formed on external surface 22a of first wall 22 of housing 20, wherein upper bracket 60 extends generally perpendicular from first wall 22. Formed proximal to the center of upper bracket 60 is upper bracket aperture 62. Bracket vertical supports 63, 64, 65 and 66 are preferably attached to rear surface 60b of upper bracket 60 to provide support to upper bracket 60 and thus display panel 100.

Lower bracket 67 is attached to or formed on external surface 24a of third wall 24 of housing 20, wherein lower bracket 67 extends generally perpendicular from third wall 24. Formed through lower bracket 67 proximal to distal ends 67c and 67d are lower bracket apertures 68a and 68b, respectively.

Display panel 100 displays a printed message(s), such as shown, for exemplary purposes only, in FIG. 1. Display panel 100 generally comprises tab 110, first bottom clip 118 and second bottom clip 120. More specifically, display panel 100 is formed having front surface 102, rear surface 104, top edge 106, and bottom edge 108. Tab 110 preferably comprises rotational leg 112 and fixed leg 114, wherein fixed leg 114 is attached to top edge 106 of display panel 100, and wherein rotational leg 112 is shaped and dimensioned to be received in upper bracket aperture 62. First bottom clip 118 and is second bottom clip 120 are attached to bottom edge 108 preferably equidistant from the center of display panel 100. Lower bracket apertures 68a and 68b are dimensioned for receiving first bottom clip 118 and second bottom clip 120, respectively. Rear surface 104 of display panel 100 rest against front surface 72 of protective translucent panel 70.

The display panel can also be connected to the front of panel 20 by other means, such as hook and loop Velcro fasteners, threaded fasteners and the like.

Now referring more specifically to FIG. 3, rear wall 26 of housing 20 is generally rectangular shaped and comprises first side edge 26a, second side edge 26b, top edge 26c and bottom edge 26d. Rear wall 26 is attached within rear recessed area 28b of housing 20, preferably by threaded screws, adhesives or any other known means within the art. Rear wall 26 contains a plurality of light bulb apertures 42, 44, 46, 48. Left turn signal light bulb aperture 44 and right turn signal light bulb aperture 42 are formed proximal to first side edge 26a and second side edge 26b, respectively, and preferably vertically centered thereat. First mounting bracket apertures 54a and 54b are formed through rear wall 26 proximal to left tail light bulb aperture 46, and second mounting bracket apertures 56a and 56b are formed through rear wall 26 proximal to right tail light bulb aperture 48 for receiving bolts to secure mounting bracket 180 of trailer hitch it connecting assembly 140.

Figure 4:
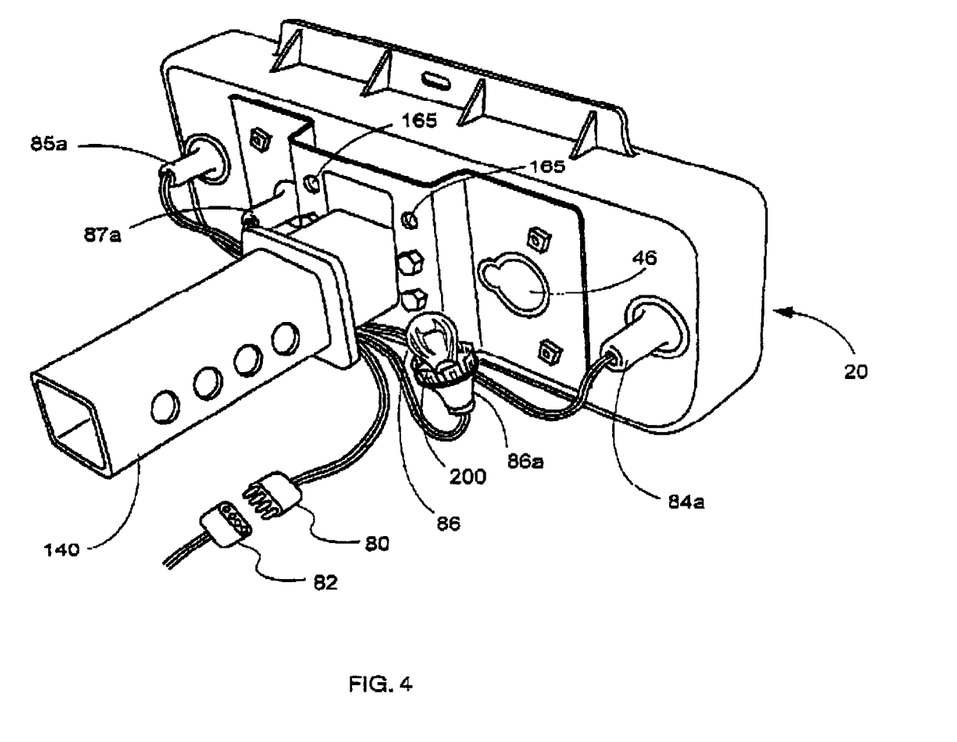
FIG. 4 is a rear perspective view of the present invention according to a preferred embodiment, showing the wiring attached.

As shown in FIGS. 2 and 4, bulbs 84, 85, 86 and 87 are held by socket 84a, 85a, 86a and 87a, respectively. Left turn signal light bulb aperture 44 and right turn signal light bulb aperture 42 are dimensioned to frictionally receive left turn signal light bulb socket 84a and right turn signal bulb socket 85a, respectively. Left tail signal light bulb aperture 46 and right tail signal light bulb aperture 48 are dimensioned to frictionally receive left tail signal light bulb socket 86a and right tail signal light bulb socket 87a, respectively. A plurality of flexible friction clips 200 are formed around the perimeter of each socket 84a, 85a, 86a, 87a to allow each socket to be snap-fit within the respective apertures. Brake light assembly 88a attached to internal surface 22b of first wall 22 of light housing 20. Turn signal light bulbs 84 and 85, tail signal light bulbs 86 and 87, and brake light bulb 88 are preferably standard tail light bulbs of the type commonly available or of types known in the art. Turn signal light bulbs 84 and 85, tail signal light bulbs 86 and 87, and brake light bulb 88 are preferably electrically connected to electrical connector 80. Electrical connector 80 is connected to the trailer hitch wiring connector 82 which is typically found on vehicles equipped with a trailer hitch.

Trailer hitch connecting assembly 140 generally comprises shell 150, vertical mounting member 160, cushion means 170 and mounting bracket 180. More specifically, mounting bracket 180 is a generally U-shaped member having left wing 182, right wing 186, center portion 190 and mounting slot 194. Mounting slot 194 is preferably positioned along the centerline of center portion 190 and is generally rectangular-shaped and dimensioned for receiving vertical mounting member 160, as more fully described below. A plurality of throughholes 165 are formed on center portion 190, on both sides of mounting slot 194, and aligned with throughholes formed in vertical mounting member 160.

To allow left tail light bulb 86 and right tail light bulb 87 to extend therethrough, left tail light bulb aperture 198a is formed through left wing 182, and right tail light bulb aperture 198b is formed through right wing 186, respectively. Left tail light bulb aperture if 198a and right tail light bulb aperture 198b are preferably positioned such that left tail light bulb aperture 46 and right tail light bulb aperture 48 are aligned when mounting bracket 180 is attached to rear surface 26 of housing 20.

Figure 5:
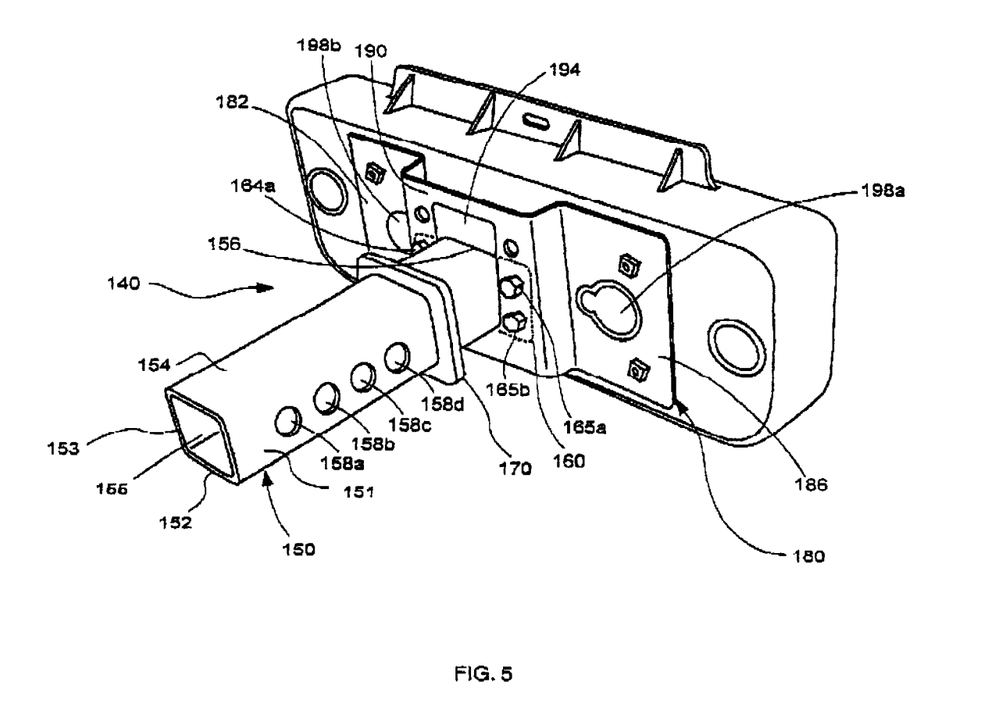
FIG. 5 is a view similar to FIG. 4, but with the wiring separated from the trailer hitch shell.

Shell 150 is preferably an elongated rectangular cross-sectional shaped member defined by first wall 151, second wall 152, third wall 153, fourth wall 154, first end 155 and second end 156. First locking pin aperture 158a, third locking pin aperture 158b, fifth locking pin aperture 158c and seventh locking pin aperture 158d are formed through first wall 151. Second locking pin aperture 159a, fourth locking pin aperture 159b, sixth locking pin aperture 159c and eighth locking pin aperture 159d are formed through third wall 153. First locking pin aperture 158a and second locking pin aperture 159a are preferably positioned directly across from and aligned with each other. Third locking pin aperture 158b and fourth locking pin aperture 159b are preferably positioned directly across from and aligned with each other. Fifth locking pin aperture 158c and sixth locking pin aperture 159c are preferably positioned directly across from and aligned with each other. Seventh locking pin aperture 158d and eighth locking pin aperture 159d are preferably positioned directly across from and aligned with each other. First end 155 is inserted into the receiver trailer hitch and hitch pins (not shown) are inserted into selected locking pin apertures to achieve a secure connection between the trailer hitch and trailer hitch lighted sign apparatus 10.

Second end 156 is attached to vertical mounting member 160 preferably by welding or any known means within the art. Vertical mounting member 160 has front surface 161, rear surface 162, first edge 163a, second edge 163b, third edge 163c and fourth edge 163d. Rear surface 162 of vertical mounting member 160 is dimensioned to fit flush to front surface 191 of mounting bracket 180. Vertical adjustment apertures 164a and 164b are vertically aligned proximal to first edge 163a of vertical mounting member 160. Vertical adjustment apertures 165a and 165b are vertically aligned proximal to third edge 163c of vertical mounting member 160.

In use, turn signal light bulbs 84 and 85 are snap-fitted into turn signal light bulb apertures 42 and 44, respectively. Tail light bulbs 86 and 87 are inserted into tail light bulb apertures 46 and 48, respectively. Brake light bulb 88 is attached to internal surface 22b of first wall 22. Protective translucent panel 70 is attached with hook and loop fastener or by other known means to front recessed area 28a.

Display panel 100 is attached to housing 20 by inserting bottom clips 118 and 120 into lower bracket apertures 68a and 68b, respectively. Rotational leg 112 of tab 110 is inserted into upper bracket aperture 62. Display panel 100 is placed flush onto protective translucent panel 70.

First end 155 of shell 150 is inserted into the vehicle trailer hitch receiving member and hitch pins are inserted into selected locking pin apertures to achieve a secure connection between the trailer hitch and trailer hitch lighted sign apparatus 10.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

Having described my invention, I claim:

1. A display apparatus attachable to a trailer hitch receiving member of a vehicle, said display apparatus comprising:
   an enclosed housing having a translucent panel;
   a display panel having indicia formed thereon, said display panel carried by and outside of said enclosed housing adjacent said translucent panel;
   means for removably attaching said housing to the trailer hitch receiving member;
   means for illuminating said display panel, wherein said display apparatus is removably attached to the vehicle and illuminated such that said indicia on said display panel is visible to the rear of the vehicle;
   wherein said display panel is generally rectangular shaped having an upper edge, a lower edge, a first side edge, a second side edge, at least one tab extending from said upper edge and at least one tab extending from said lower edge; and
   wherein said housing is generally rectangular shaped having an upper wall, a lower wall, a first sidewall, a second sidewall, a first wing extending from said upper wall and a second wing extending from said lower wall, said first wing having at least one slit formed therein, said second wing having at least one slit formed therein and wherein said at least one tab on said upper edge of said display panel is received within said at least one slit formed in said first wing of said frame, and said at least one tab on said lower edge of said display panel is received within said at least one slit formed in said second wing of said frame.

2. A display apparatus attachable to a trailer hitch receiving member of a vehicle, said display apparatus comprising:
   an enclosed housing having a translucent panel;
   a display panel having indicia formed thereon, said display panel carried by and outside of said enclosed housing adjacent said translucent panel;
   means for removably attaching said housing to the trailer hitch receiving member;
   means for illuminating said display panel, wherein said display apparatus is removably attached to the vehicle and illuminated such that said indicia on said display panel is visible to the rear of the vehicle;
   wherein said display panel is generally rectangular shaped having an upper edge, a lower edge, a first side edge, a second side edge, at least one tab extending from said upper edge and at least one tab extending from said lower edge; and
   wherein said housing is generally rectangular shaped having an upper wall, lower wall, first sidewall, second sidewall, a first wing extending from said upper wall and a second wing extending from said lower wall, said first wing having at least one slit formed therein, said second wing having at least one slit formed therein and wherein said at least one tab on said upper edge of said display panel is received within said at least one slit formed in said first wing of said frame, and said at least one tab on said lower edge of said display panel is received within said at least one slit formed in said second wing of said frame; and
   wherein said frame further comprises a rear wall, having at least one aperture therethrough for receiving said illuminating means.

3. A display apparatus attachable to a trailer hitch receiving member of a vehicle, said display apparatus comprising:
   an enclosed housing having a translucent panel and a first and second wing extending outwardly from said housing, and said first and second wings having apertures extending therethrough;
   a display panel having a first tab and a second tab, said display panel having indicia thereon, said display panel carried by said housing by having said first and second tabs being received by said apertures in said first and second wings;
   a member attached to said housing for removably attaching said housing to the trailer hitch receiving member; and
   means for illuminating said display panel,
   wherein said display apparatus is removably attached to the vehicle and illuminated such that said indicia on said display panel is visible to the rear of the vehicle.

4. The display apparatus of claim 3, wherein said member has at least one aperture therethrough and is dimensioned to be slidably received within the trailer hitch receiving member of the vehicle.

5. The display apparatus of claim 3, wherein said illuminating means is at least one bulb.

6. The display apparatus of claim 3, wherein said display panel is generally rectangular shaped having an upper edge, a lower edge, a first side edge and a second side edge, and wherein said first tab extends from said upper edge and said second tab extends from said lower edge.

7. The display apparatus of claim 6, wherein said housing is generally rectangular-shaped having an upper wall, a lower wall, a first sidewall, a second sidewall, said first wing extending from said upper wall and said second wing extending from said lower wall, said aperture in said first wing being a slit formed therein, said aperture in said second wing being a slit formed therein, and wherein said first tab on said upper edge of said display panel is received within said at least one slit formed in said first wing of said housing, and said second tab on said lower edge of said display panel is received within said at least one slit formed in said second wing of said housing.

8. The display apparatus of claim 7, wherein said housing further comprises a rear wall, having at least one aperture therethrough for receiving said illuminating means.

9. The display apparatus of claim 3, wherein said display panel is transparent.

10. The display apparatus of claim 3, wherein said display panel is translucent.

11. A display apparatus attachable to a trailer hitch receiving member of a vehicle, said display apparatus comprising:

an enclosed housing having an upper wall, a lower wall, a first sidewall, a second sidewall, a rear wall having a plurality of apertures formed therethrough, a first wing extending from said upper wall and a second wing extending from said lower wall, said first wing having a first platform therein, said second wing having two slits formed therein and said housing having a translucent panel;

a generally rectangular display panel having an upper edge, a lower edge, a first side edge, and a second side edge, a first tab extending from said upper edge, a second tab extending from said lower edge, and a third tab extending from said lower edge, said display panel having indicia thereon, said display panel being carried by said housing;

a rectangular beam having a plurality of throughholes therethrough, said beam attached to said housing and dimensioned for slidably engaging within the trailer hitch receiving member thereby attaching said housing to the vehicle; and a plurality of bulbs for illuminating said display panel, each of said plurality of bulbs being received within one of said plurality of apertures of said rear wall of said housing;

wherein said display apparatus is removably attached to the vehicle, and wherein said plurality of bulbs are energized thereby illuminating said display panel such that said indicia on said display panel is visible to the rear of the vehicle.

12. The display apparatus of claim 11, wherein said display panel is transparent.

13. The display apparatus of claim 11, wherein said display panel is translucent.

\* \* \* \* \*

UNITED STATES PATENT AND TRADEMARK OFFICE
CERTIFICATE OF CORRECTION

PATENT NO. : 6,553,697 B1 Page 1 of 1
DATED : April 29, 2003
INVENTOR(S) : Pichan It is certified that error appears in the above-identified patent and that said Letters Patent is hereby corrected as shown below:

Column 3,
Line 54, please delete "is";

Column 4,
Line 13, please delete "it";
Lines 30-33, after "88," please insert -- are preferably standard tail light bulbs of the type commonly available or of types known in the art. Turn signal light bulbs 84 and 85, tail signal light bulbs 86 and 87, and brake light bulb 88 --;

Column 6,
Line 10, please delete "on-said," and insert -- on said --.

Signed and Sealed this

Twenty-sixth Day of August, 2003

JAMES E. ROGAN
*Director of the United States Patent and Trademark Office*